Nov. 1, 1932.  H. L. DOHERTY  1,885,807
PRODUCTION OF OIL FROM OIL SANDS IN THE EARTH
Filed Aug. 28, 1924  2 Sheets-Sheet 1
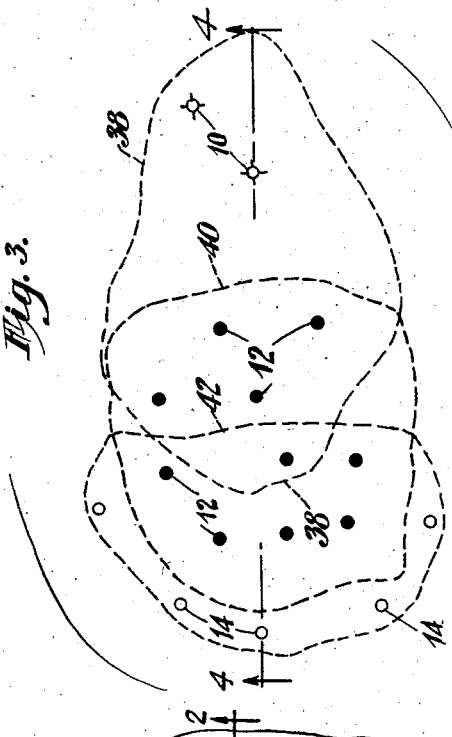
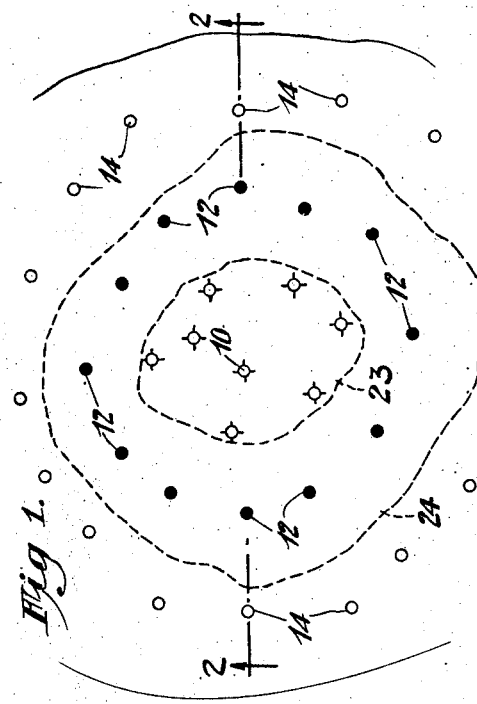
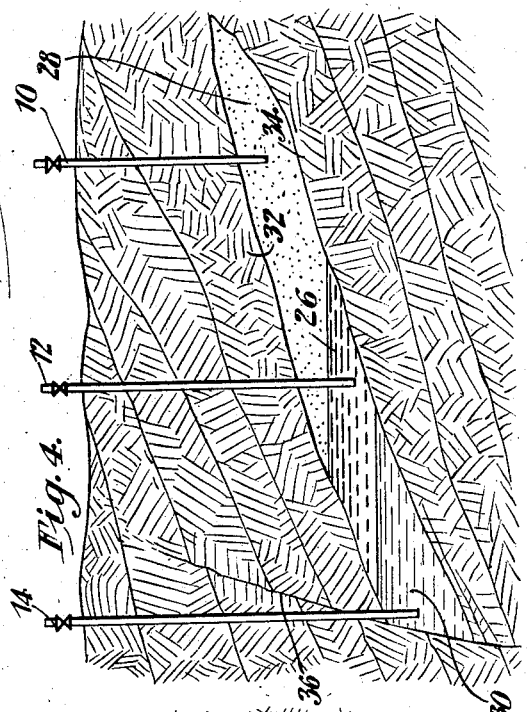
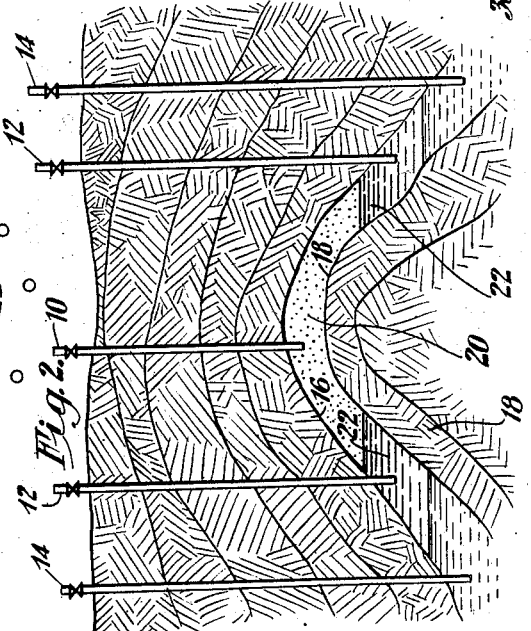
Henry L. Doherty Inventor
By His Attorney
Edmund G. Borden

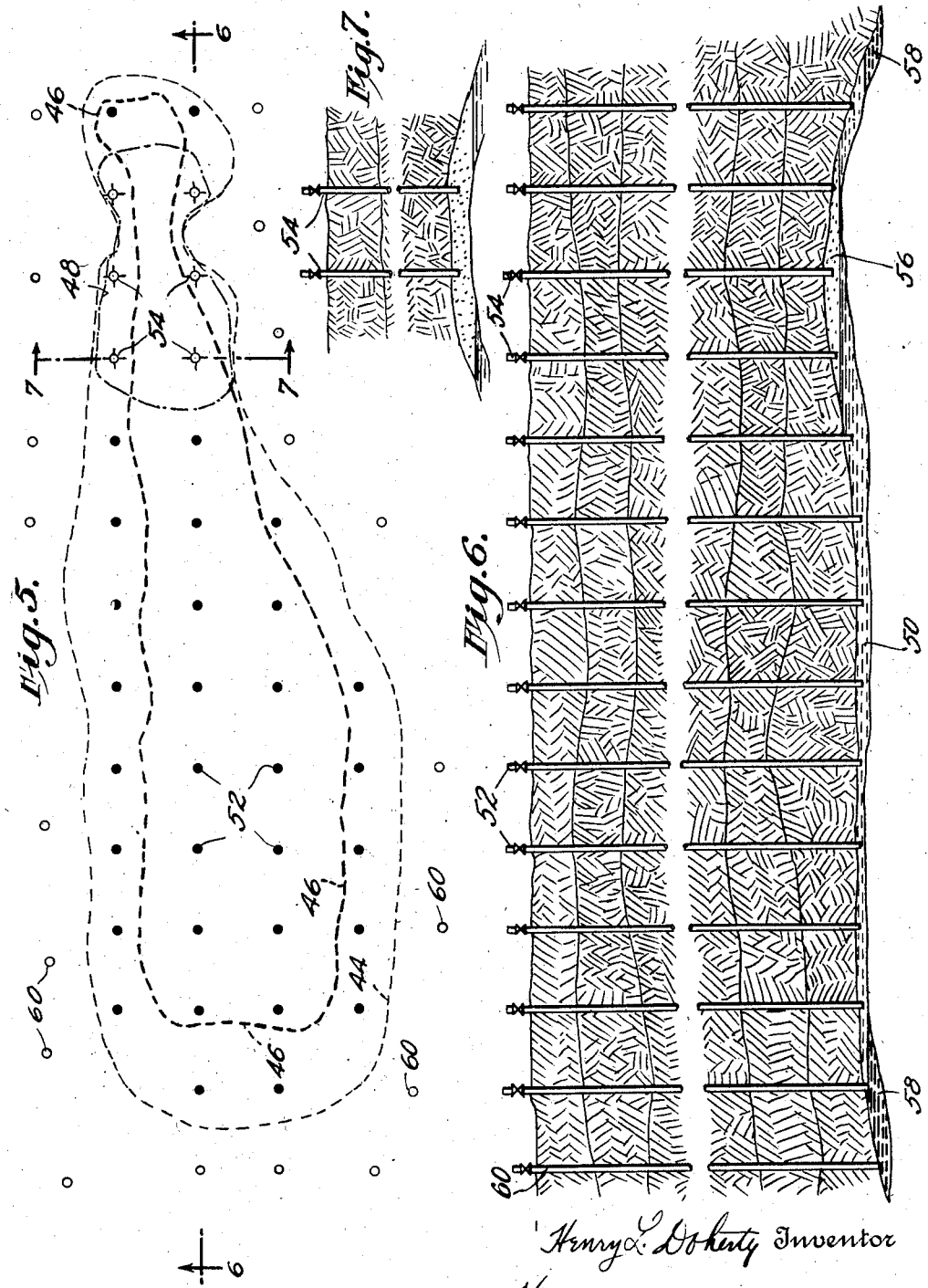

Patented Nov. 1, 1932

1,885,807

UNITED STATES PATENT OFFICE

HENRY L. DOHERTY, OF NEW YORK, N. Y.

PRODUCTION OF OIL FROM OIL SANDS IN THE EARTH

Application filed August 28, 1924. Serial No. 734,627.

This invention relates to the production of oil from oil sands in the earth, and more particularly to an improved method adapted for the development both of a field from which no oil has been previously removed, as well as the development of a field from which oil has been previously removed. This invention is a continuation in part of that described in my co-pending application Serial No. 705,562, filed April 10th, 1924.

The primary object of the present invention is to provide a method of oil production by which a comparatively high percentage of oil may be recovered from an oil sand without the economic wastes which result from the present methods of oil production.

Past experience has shown that oil occurs in the earth as bodies or pools absorbed in the porous sands. The oil sands are usually positioned between impervious rock strata and generally a body of water occurs in the sand below the oil body, and a body of gas occurs in the sand above the oil body. These bodies of oil, gas and water occur under comparatively high pressures, so that when the pressure is relieved in the oil or gas body through one or more wells, the effect of this pressure release is reflected throughout a large portion of the pool or field in which the oil occurs. Further, a release of the pressure on the gas or oil bodies permits the gas and water to channel through the oil sands toward the oil wells, which tends to materially decrease the recovery of the oil. The dissipation of gas through an oil well and the consequent loss of pressure in the oil sands cut down the amount of oil which will flow through the well under natural conditions, and the occurrence of the water with the oil tends to decrease the oil production and to cause losses and annoyance due to the necessity of pumping the water and to the necessity of dehydrating or separating the water from the oil.

With this in view another object of the invention is to provide a method of developing oil fields by which the oil may be produced while maintaining pressure on the oil body such that the gas loss and annoyance of water accompanying the oil may be avoided.

Another object of the invention is to provide a process by which oil may be produced simultaneously over the entire area or the greater part of the area of the oil body.

Another object of the invention is to provide a method of producing oil from sands by which the escape of gas with the oil may be held to a minimum.

A further object of the invention is to provide a method of producing oil from sands by which the association of water with the oil may be prevented until the greater portion of the oil is removed from the sands.

Another object of the present invention is to provide a method of developing oil fields which have previously been worked and partially depleted, to recover an additional amount of oil therefrom.

Another object of the invention is to provide a method of developing depleted oil fields by which oil may be caused to flow from wells from which it had been necessary previously to recover the oil by pumping.

Another object of the invention is to provide a method of developing depleted oil fields by which dead oil may be recovered from isolated bodies of oil sand left in the ground by channelling of oil, gas and water by the usual methods of production.

With these and other objects in view, the invention consists in the improved method of developing oil fields hereinafter described and particularly defined in the appended claims.

The various features of the invention are illustrated in the accompanying drawing, in which, Fig. 1 is a top plan view.

Fig. 2 is a vertical sectional view taken on the line 2—2 of Fig. 1 diagrammatically illustrating a preferred embodiment of the invention as applied to a dome structure oil pool.

Fig. 3 is a plan view.

Fig. 4 is a vertical sectional view taken on the line 4—4 of Fig. 3, diagrammatically illustrating the application of the preferred embodiment of the invention to a body of oil occurring in a fault structure.

Fig. 5 is a diagrammatic plan view illustrating the arrangement of oil wells in a depleted oil field.

Fig. 6 is a vertical sectional view taken on the line 6—6 of Fig. 5 showing the position of the oil sand in the earth's strata; and Fig. 7 is a vertical sectional view of the earth's strata taken on the line 7—7 of Fig. 5 illustrating the position of a gas body in the oil sand.

Petroleum oil is one of the great national resources and should be conserved. The present methods of oil production are very wasteful, both of the oil and the gas which usually accompanies the oil body. The production of gas which usually accompanies the production of oil is of such a nature that the greatest part of the gas is lost. The presence of water with the oil during production causes many losses and annoyances. Water generally carries a large percentage of salts and this water actively corrodes the casing, tubing, and the pumps. Further, the water readily emulsifies with the oil and causes a considerable expense in the separation of the oil from the water and emulsion. Also the water often floods the wells and cuts down or stops the flow of oil.

The present invention relates to a method of oil production by which a body of oil is developed as a unit. In this method the body of gas above the body of oil, if there is a body of gas, is maintained in substantially its normal condition and the body of water below the body of oil is controlled to prevent the water from channelling through the oil body to the wells. The oil is preferably produced by flowing the wells while maintaining a back pressure on the wells whereby the pressure of the oil in the oil sands is maintained at substantially the pressure at which it naturally occurs. The oil in the sand is displaced by water by slowly and simultaneously raising the level of the body of water below the oil body to exert sufficient pressure on the oil body to force the oil upwardly through the wells to the surface. The pressure of the water on the oil is maintained by maintaining the gas pressure above the oil sufficiently high to prevent the oil from working up into the non-wetted oil sands which are occupied by the gas.

The development of an oil body as a unit under the present laws requires that the developer own or control all of the surface land under which the oil body is located. In many cases it is not practicable for one party to have control of all of the surface land under which an oil body is located. Therefore it is anticipated that the increased recovery of oil under the present invention and similar methods, and a greater conservation of gas, will act to stimulate national and state legislation which will require that all oil bodies that may be located shall be developed as a unit for the sake of conservation and economy.

To develop an oil field in accordance with the present invention it is necessary to locate quite definitely the position and boundaries of the oil body. The location of the oil body is usually effected by exploration. The term "exploration" is intended to include all the common and usual methods being used for locating oil wells. For example, geological structures indicate the position of oil bodies, various types of drilling mechanism together with geological indications assist in locating oil bodies. Actual drilling of a comparatively large area will assist in locating oil bodies, and generally the definite boundary lines of an oil body are determined by drilling operations. While locating an oil body in accordance with the present invention it is very desirable that the area and boundaries of one or more gas bodies accompanying the oil body, if there is gas present, be definitely located. Then the oil horizon or lower boundary should be located to find the position of the water body below the oil body.

Referring to Figures 1 and 2, gas wells 10 should be drilled into what would be the top of a dome structure to locate the position of the gas body above the oil. When these wells are drilled precaution should be taken to keep the wells closed so that when the gas body is tapped by the well the gas cannot escape and the pressure may be maintained within the gas sand. Simultaneously with the drilling of the gas wells 10, oil wells 12 should be drilled to determine the boundaries of the oil body, and flowing wells should be located in the oil body such that the wells will project into the upper portion of the oil body. As the oil wells are drilled they should be kept closed and any oil which might flow through the wells should flow only against a sufficient back pressure to maintain substantially the original oil pressure in the oil sands. While the oil wells 12 are being drilled water wells 14 should be drilled around the entire oil body, these wells being drilled a sufficient distance away from the oil body so that water may be introduced through the wells 14 into the sand below the bottom of the oil body in the sand. The sand into which the water is introduced through the wells 14 is the same sand in which the oil occurs and the gas occurs, the oil, water and gas sands being located between an upper impervious strata 16 and a lower impervious strata 18. This sand is hereinafter referred to as "oil sand". When water is introduced into the oil sand through the wells 14 it will tend to move upwardly through the sand to raise the level of the body of water in the sand between the impervious structure 16 and 18 and thus tend to lift the oil body. If the pressure of the gas body 20 above the oil body 22 is maintained sufficiently high to prevent the oil body from moving upwardly into the gas sand, the oil will pass upwardly through the wells and can be withdrawn by a natural flow against a back pressure. The water wells 14 are located sufficiently far beyond the oil horizon so that the water may be introduced comparatively slowly and will gradually rise to bring up the entire water surface below the bottom of the oil body as a unit, and thus do away with the tendency of the water to channel through the sands in passing toward the oil well outlets. Accordingly, there will be a comparatively large number of oil wells as distinguished from water wells, the number of oil wells being such that substantially all parts of the oil body will have an outlet, so that the oil may flow outwardly when subjected to a water pressure acting on the bottom of the oil body. The water will be introduced simultaneously through all of the wells 14 surrounding the oil body and oil may be simultaneously flowed through all or the greater part of the oil wells projecting into the oil body. If there is no avenue of escape of water into outlying sands, the amount of oil produced through the oil wells should equal the amount of water pumped into the oil sand through the water wells.

It will be quite evident upon reflection that a dome structure such as illustrated in Figs. 1 and 2 wherein the dotted line 23 indicates the boundary line of the gas body and the dotted line 24 indicates the outer horizon of the oil body, does not occur in the earth. The angle of inclination of the strata in practically all of the fields is much less than that illustrated and the area covered by an oil body, or pool generally consists of many square miles. Furthermore, the oil said does not have the uniform thickness, and the impervious stratas may come together in many parts of the field within the pool area so that there will be islands or zones in which there will be no oil sand or oil. When water is introduced into the oil sand around the horizon of the oil body the water may have to travel many feet or many miles before it will materially affect the pressure of the oil in some portions of the body. However, if the pressure is maintained throughout the oil body and the gas pressure is maintained above the oil body by a slow gradual process the water may be forced through the oil sand to drive the oil out of the sand through the wells. Furthermore, as the water advances through the sand and past outlets which formerly served as an outlet for oil, this oil outlet may be used as a water inlet.

As illustrated in Figs. 3 and 4 an oil body 26 is located between a gas body 28 and a water body 30, all of these bodies being located in an oil sand which is held between an impervious upper strata 32, and an impervious lower strata 34. A body of oil of this kind is illustrated as being trapped along a fault line 36. This body of oil would be located by exploration in substantially the same way as the body of oil in a dome structure, to determine the boundaries of the gas body, the oil body and the water body. In Fig. 3 the dotted line 38 indicates the boundary of the gas body, the dotted line 40 the boundary line of the oil body, and the dotted line 42 the boundary line of the water body. The gas wells 10 would be closed, the oil wells 12 would be arranged to flow against a back pressure, and the water would be introduced simultaneously through the water wells 14. As the water body 30 rises through the oil sand the oil will pass outwardly through the wells 12 so that substantially all of the oil recovered from the sands will be recovered through flowing wells. As the wells 12 lower in the oil body start to show water these wells should be closed and the wells higher in the structure are used to recover the oil.

The depleted oil field diagrammatically illustrated in Figs. 5 to 7 is intended to represent an oil field in which the original boundary of an oil body is indicated by the dotted line 44, the inner boundary of a water body below the oil body is indicated by the heavy dotted line 46, and the boundary of a gas body which originally existed above the oil body is shown by the dot and dash line 48. It is assumed that the outlines of the oil, water and gas bodies have been determined by exploration and development and that some of the oil existing in the body 50 has been removed through wells 52, the wells 52 being illustrated as black dots to represent wells through which oil has been recovered. In the exploration it has been found that a gas body exists within the confines of the line 48 and this gas has been withdrawn through gas wells 54. The oil body 50 is illustrated as being located in an earth stratum in an oil sand which is located between impervious stratas, one strata being above the oil sand, and the other strata being below the oil sand. The term "oil sand" is used herein to refer to the sand or rock stratum in which the oil body 50 is located. In addition to oil, the oil sand carries a body of gas 56 and a body of water 58. The gas body is generally located above the oil body, and the water body is generally located below the oil body, these bodies being positioned in respect to their various gravities. The drawing illustrates a flat dome structure so that the water body 58 surrounds the oil body 50.

In the development of an oil field such as illustrated in Figs. 5 to 7, by the common method of oil production the oil is recovered by projecting wells into the oil sand and recovering the oil through flowing wells as long as the pressure of the oil in the sand is sufficient to raise the oil to the surface. When the oil stops flowing the wells are pumped to recover the oil. The pumping operation continues so long as sufficient oil can be drawn from the sands through the wells to pay for pumping. As oil is drawn out of the sand through the wells, water almost universally rises in the oil sands and percolates toward the oil well outlet so that in practically all cases water is associated with the oil at the time the oil is pumped from the wells.

In most of the common methods of developing oil fields it is customary to leave the oil wells open so that they will flow the full amount of oil that will be forced out of them by the natural pressure of the oil in the sands and as this pressure is dissipated there is a tendency for the oil, gas and water in this oil sand to channel through the sands in escaping to the surface of the earth. It is through these channels that the oil is drawn principally during the pumping operation, and it is through the channels that the water and gas works it way from the lower levels to the oil wells.

The present invention has to do also with the development of an oil field such as described above where in all of the wells which were producing oil do not produce enough oil to pay for pumping. To develop such an oil field in accordance with the present invention all of the wells—dry wells, oil wells and gas wells—are closed. It is customary in the usual method of development of an oil field to draw out the casing when a well stops its production. It is necessary to see that a well of this kind is thoroughly sealed so that oil, water or gas cannot escape through the opening. In most cases in which a well has been destroyed it is advisable to locate a new well in the vicinity of the abandoned well from which the casing is withdrawn, but preferably the new well will be positioned midway between the location of the old wells. It is preferred in every case to retain the old casing and to repair the wells so that when they are closed at the top there will be no escape of oil, water or gas around the casing to the surface of the earth. While the oil wells within the original production area are being repaired and closed, a series of water wells 60 are located around the oil body at a sufficient distance from the original position of the oil body that water may be introduced therein without directly passing into the channels formed in the oil sand. When the water wells have been located around the entire oil body, water is pumped into the oil sand so as to be introduced into the oil sand in the original position occupied by the water body 58. This water is introduced very slowly whereby it will have a tendency to rise in the oil sand as a unit body rather than to flow directly through channels in the sand toward well outlets. Thus oil wells which are lowest in the oil sand will be the first to be reached by the rising oil and will be the first to be opened to the flow of oil. In order to induce the oil to flow through such wells and through the next higher wells in succession as the oil level rises, a counter-pressure is built up over the oil body. This counter-pressure is effected by introducing air or gas through such wells as have not been reached by the rising oil. Furthermore, by maintaining a counter-pressure over the oil body any tendency of the water to channel upwardly will be more or less neutralized and the water be caused to spread more uniformly throughout the oil sands in a common level and under islands of oil which are usually isolated by the channels in the sand. The gas pressure preferably will be high enough to permit the oil to be produced through the oil wells 52 against a back pressure. The gas pressure also will tend to hold the oil in the oil sand in its position which it originally occupied so that as the water which is introduced around the oil horizon rises in the oil sand, the oil will be removed from the oil sand by displacement of the oil by the water.

As the oil rises in the oil sand due to the inflow of water thereunder, the wells in the sand which are located low enough in the strata to receive flow water are closed so that water is not allowed to escape from these wells. By closing these wells the oil as it rises in the sand will be removed through wells which are higher up in the oil sands. At the time that the water occupies substantially the same position in the oil sand which was formerly occupied by the oil, wells lower in the oil sand structure and which had originally been closed while forcing the oil out through wells in the upper portion of the structure, may be opened to permit water to pass through the sands and to wash oil out of the sands by a scrubbing action. At this time the oil wells will flow both water and oil and the washing of the sands will continue until the amount of oil recovered is not sufficient to pay for the expense of pumping water in the oil sands.

When developing oil fields in accordance with the present invention, the water used normally will be the same type of salt water which occurs naturally in the oil fields, and this water may be handled through a single pumping station. It will be apparent that a comparatively low pressure will be required for producing oil because there are balanced hydrostatic heads in the oil wells and water wells. The water wells are deeper than the oil wells and due to the fact that the water has a higher specific gravity than the oil, there would be a natural tendency for the oil to be forced out of the sands through the oil wells if the resistance of the flow of water through the oil sands was not too high. Therefore in pumping the water into the wells 14 and 60 the only pressure which is required is that pressure which is necessary to overcome the resistance of the flow of water through the oil sand. Furthermore, it will be seen that the deeper the wells the greater will be the advantage of recovering oil by the balanced heads of water and oil because the higher hydrostatic heads of water tend to create a greater pressure for forcing the oil out of the ground. This is very important because by this method it is possible to force oil out of the sands which are very far from the surface of the earth where it is impracticable to remove oil from the wells by pumping due to the mechanical limitations of the ordinary pumping mechanisms.

The nature of the water used for washing the oil sands, the temperature of the water and the velocity of the travel of the water through the sand materially affects the amount of oil which may be recovered from the sands. Many tests however show that from 2 to 5 times as much oil may be washed out of the sands by the flow of water through it than can be recovered in the usual methods of oil production.

It is important to maintain the gas pressure on the oil body to prevent the movement of the oil up into the gas sand. The dry gas sand will blot or take up a comparatively large amount of oil under the capillary attraction of the oil and it is very difficult to recover the oil which is held by capillarity in the sand. The present invention therefore contemplates the control of the oil pressure in the oil sand and the control of the flow of oil from the sand so that the oil will not move out of the strata in which it naturally occurred.

In many oil bodies gas occurs with the oil and this gas occurs both as a distinct body of gas above an oil body and as gas absorbed or entrained in the oil body. The amount of gas absorbed varies for different characters of the oil and varies according to the pressure under which the oil exists, but the present method of developing oil fields contemplates that the amount of gas which shall be permitted to flow through a well with the oil should be approximately only that which naturally occurs in the sand along with the oil, either as entrained or absorbed gas. As the oil with the gas absorbed therein flows upwardly through the wells against a back pressure its pressure gradually becomes lower as the hydrostatic head decreases so that the gas will be released from the oil and bubble up through the oil. This effervescence or bubbling of gas through the oil will act as an air lift to assist in raising the oil and also to lower the gravity of the oil produced in the oil well. The lowering of the gravity of the oil body tends to counterbalance the hydrostatic head in the oil well as distinguished from the hydrostatic head in the water well, and thus facilitates the production of the oil through the unbalanced columns of the water and oil. If the pressure is maintained in the oil sand substantially as high as the pressure in which the oil naturally exists in the sand, there will be no substantial release in the sand of the gas from the oil, and therefore the volume of the gas produced will indicate quite accurately the pressure of the oil in the sand.

After the water has passed through the oil sand, the oil wells may be opened to permit water to flow through the oil wells in order to wash oil out of the sands and carry it to the surface with the water. After the oil has been substantially removed from the oil sand the gas wells may be opened and in many cases it may be advantageous to close the former oil wells and to pump water into the gas sand to force gas out of the sand. When washing gas out of the sands the water may be introduced much more rapidly than when washing oil out of the sands because there is not the same tendency for the water to channel through the gas sand to by-pass bodies of gas as there is for the water to channel through the oil sand and leave islands of oil in the sand.

Oil sands have different degrees of porosity and therefore the pressure which must be placed upon the water which is used to wash the oil sands will vary in accordance with these different sands. The presence of the gas with water often facilitates the movement of the water through the oil sand. Therefore, small amounts of gas may be introduced with the water to assist the movement of the water through the oil sands.

If from time to time the pressure gauges used on the gas wells indicate that the gas pressure above the oil body is decreasing, it may often be desirable to pump air or gas in through the gas wells 10 to maintain a sufficiently high gas pressure above the oil body to prevent the penetration of the oil into the gas sand.

The preferred form of the invention having been thus described, what is claimed as new is:

1. A method of developing a partially depleted oil body, comprising closing all oil and gas wells penetrating the oil sand, inserting a series of water wells at spaced intervals around substantially the entire original outer boundary of the oil body with their lower ends extending into the oil sand below the oil body, pumping gas into the oil sand above the oil body under pressure sufficient to prevent the oil from rising into unwetted sand and to prevent substantial channelling, opening oil wells in the outer rim of the oil body and introducing water into the water wells simultaneously around the greater portion of the area of the oil body to thereby gradually displace the oil body as a unit from below upwardly.

2. A method of developing a partially developed oil body, comprising closing all oil and gas wells penetrating the oil sand, inserting a series of water wells at spaced intervals around substantially the entire original outer boundary of the oil body with their lower ends extending into the oil sand below the oil body, building up a gas pressure in and above the oil body, introducing water through the water wells and controlling the rate of flow of water to gradually raise the water level under the entire area of oil body, opening some of the wells projecting into the oil body and flowing oil therethrough, and maintaining a sufficient gas pressure to prevent the oil body from rising in the sand so as to permit the water to displace the oil in the sand as its level rises.

3. A method of developing a partially developed oil body, comprising opening a series of water wells at spaced intervals around the entire margin of the area covered by the oil body with their lower ends extending into the oil sand below the oil body, introducing gas under pressure into the sand above the oil body under pressure sufficient to prevent the oil body from rising in the sand, slowly forcing water through the water wells into the oil sand below the oil body and around substantially the entire area of the oil body under pressure sufficient to displace the overlying oil, and flowing oil thus displaced simultaneously through wells projecting into the oil body in positions arranged to drain substantially the entire area of the oil body.

4. A method of developing a partially depleted underground oil sand into which oil wells project, comprising introducing water into the oil sand simultaneously through a plurality of water wells which are located at spaced intervals around the entire outer margin of the oil body therein and thereby displacing the oil upwardly, maintaining a counter gas pressure over the said oil body above the water-filled sand sufficient to prevent the upper level of the oil body from rising into unwetted sand, and confining the flow of oil displaced from the oil body to those oil wells which are nearest the water wells.

5. A method of developing a partially depleted oil sand into which oil wells project, comprising initially introducing water into the oil sand through wells which are located around the entire original outer margin of the oil body therein and thereby displacing said body as a unit upwardly, maintaining a counter gas pressure over the oil body sufficient to prevent it from rising into unwetted sand, confining the flow of oil to those oil wells which are nearest the water wells, discontinuing the introduction of water through the wells first used for that purpose when the adjacent wells flow an excessive amount of water as compared with oil and instead using said last-mentioned wells as points of introduction of water into the oil sand, and again confining the flow of oil to those oil wells next inwardly of the newly established water wells while maintaining said gas pressure over the oil sand.

6. A method of developing an oil field as a unit comprising determining the location boundary of an underground oil body, maintaining the oil in its original position in the oil sand by holding a body of gas above the oil body under sufficient pressure to prevent oil from passing up into unwetted sand, extending oil wells into the oil body and forcing oil from that body out through the wells by raising the level of a body of water below the oil body, and maintaining sufficient back pressure on the oil flowing through the wells to hold the oil body under substantially its natural pressure.

7. A method of developing new oil fields comprising determining the location boundary of an underground oil body, maintaining a body of gas above and in contact with the oil body under sufficient pressure to hold the upper surface of the oil body in substantially its original level, projecting oil wells into the oil body in sufficient numbers to provide an outlet for oil throughout substantially the entire area of the oil body, flowing oil from that body through said wells by introducing water into the oil sand below the oil body, and holding a sufficient pressure on the oil flowing through the wells to prevent the escape of gas through the oil wells other than that dissolved or absorbed in the oil.

In testimony whereof I affix my signature.
HENRY L. DOHERTY.